United States Patent [19]

Callaghan et al.

[11] Patent Number: 4,711,714
[45] Date of Patent: Dec. 8, 1987

[54] METHOD FOR THE SEPARATION OF GAS FROM OIL

[75] Inventors: Ian C. Callaghan, Wokingham; Clive M. Gould, Colnbrook, both of England; Wojciech Grabowski, Versoix, Switzerland

[73] Assignee: The British Petroleum Company p.l.c., London, England

[21] Appl. No.: 747,275

[22] Filed: Jun. 21, 1985

[30] Foreign Application Priority Data

Jun. 30, 1984 [GB] United Kingdom ............... 8416697

[51] Int. Cl.$^4$ ............................................. B01D 19/04
[52] U.S. Cl. .................... 208/348; 208/370; 208/358; 252/49.6
[58] Field of Search .............. 208/48 AA, 40, 125, 208/348, 370, 358; 585/7, 10; 252/49.6, 49.3

[56] References Cited

U.S. PATENT DOCUMENTS

| | | | |
|---|---|---|---|
| 2,834,748 | 5/1958 | Bailey et al. | 252/49.6 |
| 2,846,458 | 8/1958 | Haluska | 252/49.6 |
| 2,862,885 | 12/1958 | Nelson | 252/49.6 |
| 3,233,986 | 2/1966 | Morehouse | 252/358 X |
| 3,234,252 | 2/1966 | Pater | 252/49.3 |
| 3,280,160 | 10/1966 | Bailey | 252/358 X |
| 3,700,587 | 10/1972 | Hyde | 208/131 X |
| 3,856,701 | 12/1974 | Householder | 252/358 |
| 4,042,528 | 4/1977 | Akira | |
| 4,183,820 | 1/1980 | Theile et al. | 252/358 X |
| 4,329,528 | 5/1982 | Evans | 208/348 |
| 4,395,352 | 7/1983 | Kulkarni et al. | 252/358 X |
| 4,537,077 | 8/1985 | Keil | 208/370 |
| 4,557,737 | 12/1985 | Callaghan et al. | 252/358 X |

Primary Examiner—Andrew H. Metz
Assistant Examiner—Glenn Caldarola
Attorney, Agent, or Firm—Morgan & Finnegan

[57] ABSTRACT

Water-insoluble polyoxyalkylene graft copolymers are effective anti-foam agents for reducing foaming in crude oil/gas separators. The copolymers are of formula:

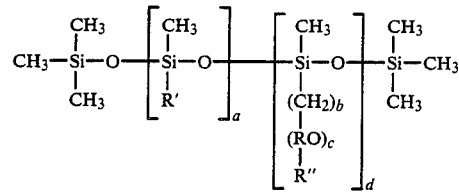

wherein

R is an ethylene, propylene or butene group or a mixture thereof;

R' is a hydrocarbyl group containing 1 to 8 carbon atoms;

R" is a hydroxyl group, an alkoxy group or an alkyl group containing 1 to 8 carbon atoms;

(a) is a number in the range 100 to 250;
(b) is a number in the range 1 to 6;
(c) is a number in the range 1 to 10; and
(d) is a number in the range 10 to 100.

They are particularly useful in breaking microgas dispersions and foams resulting from crude oils with a high gas to oil ratio.

8 Claims, No Drawings

METHOD FOR THE SEPARATION OF GAS FROM OIL

This invention relates to a method for separating gas from crude oil in which an additive is employed to reduce foaming and to a stabilised composition containing the additive.

When oil is produced from a well, it may be forced from a reservoir by pressure up the well to the surface. As the oil rises, the pressure becomes less, and gas associated with the oil is progressively released from solution.

After emerging from the well, it is usually necessary to treat the mixture of liquid oil and gas to remove free gas and dissolved gas which may come out of solution when the oil is maintained at or near atmospheric pressure, for example, during transport in a tanker.

Separation may be carried out near the wellhead or at a distant location after the oil and gas have been pumped under high pressure through a pipeline.

Separation is effected in a vessel known as a separator. Various types of separator are known. One common type is the horizontal separator which comprises a horizontal cylinder containing a system of baffles, defoamers and mist extractors. The crude oil enters at one end and flows towards an outlet at the other end. During the time it takes to do this, the gas bubbles out of solution and leaves the separator by a gas outlet at the top.

The removal of excessive quantities of butane and pentane in the gas stream and the loss of oil resulting from the formation of a spray or mist in single stage separation, particularly the former, can be alleviated by separating the gas from the crude oil in a number of stages. This is known a multi-stage separation. In this method, a number of vessels are used in series, the crude oil passing from one vessel to the next and undergoing a successive reduction of pressure in each.

In certain instance it is advantageous to inject an anti-foam additive, eg, a silicone, into the oil stream before it enters the separator. This additive breaks the foam and in effect increases the handling capacity of the separator.

Certain foams termed micro gas dispersions are difficult to break by means of conventional anti-foam agents. A micro gas dispersion is a dispersion of a gas in a liquid in which the gas bubbles are less than 50 microns in size and can move essentially independently in the liquid. This is distinguished from other foams in which the gas bubbles are larger than 50 microns and relatively immovable. The specific gravity of the latter is nearer to that of the gas than is the case with a micro gas dispersion. Micro gas dispersions tend to be more stable and difficult to break than other foams.

Micro gas dispersions are often produced from live crude oils from which methane has been at least partially removed. Such crude oils may be received from offshore locations where the methane has been separated and employed to power offshore facilities and/or flared.

Other foams which are difficult to resolve by conventional anti-foam agents are those resulting from freshly stabilised crude oils which can dissolve relatively large quantities of non-polar materials such as polydimethylsiloxanes (PDMS).

It is an object of the present invention to provide an improved method for reducing foam formation, and, in particular, a method which is capable of dealing with foams which are normally difficult to break, such as those with a high gas to oil ratio.

We have now discovered that the use of certain graft copolymers of alkylene oxides and polysiloxanes achieves this objective.

Thus according to the present invention there is provided a method for separating crude oil containing associated gas into liquid oil and free gas in the presence of an anti-foam agent which is a water-insoluble polysiloxane polyoxyalkylene graft copolymer

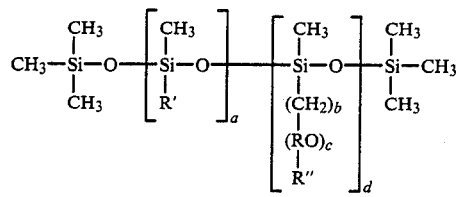

wherein
R is an ethylene, propylene or butene group or a mixture thereof, but is preferably ethylene;
R' is a hydrocarbyl group containing 1 to 8 carbon atoms, preferably an alkyl group containing 1 to 4 carbon atoms, most preferably methyl;
R" is a hydroxyl group, an alkoxy group or an alkyl group containing 1 to 8 carbon atoms, preferably an alkyl group containing 1 to 4 carbon atoms, for example, methyl;
(a) is a number in the range 100 to 250;
(b) is a number in the range of 1 to 6;
(c) is a number in the range 1 to 10; and
(d) is a number in the range 10 to 100.

Preferably the ratio of (a) to (d) is in the range 2:1 to 15:1.

Preferably R" in the above formula is hydroxyl.

When this is so, the ratio of silicon atoms to hydroxyl groups should be in the range 2:1 to 16:1, preferably in the range 6:1 to 9:1.

Suitably the siloxane content of the copolymer is in the range 30–70% by weight, preferably 55–65% by weight.

The compounds may be prepared by reacting a polysiloxane containing functionalised groups located along the polymer with polyoxyalkylene containing molecules to attach the side chains to the polysiloxane backbone.

The copolymer anti-foam agents are effective in both high pressure separators and low pressure separators used, for example, at terminals where crude oil from offshore fields is received through a pipeline. Such crude oil normally contains little or no methane, as previously explained.

They can also be employed at crude oil gathering centres where the separation of crude liquid oil from gases, including methane, is carried out.

The copolymer is usually dispersed in a liquid hydrocarbon medium such as toluene before being added to the crude oil. The nature of the medium is not critical, however.

The copolymer is preferably employed in amount 0.1 to 20 ppm expressed on the basis of active ingredient.

After treatment and following storage and/or transportation, the concentration of active ingredient in the degassed oil may be somewhat less than that added, since some may be lost by adsorption on the walls of containers.

The copolymers are also suitable for use as demulsifiers in breaking emulsions, particularly emulsions of crude oil and water.

The invention is illustrated by the following Examples.

EXAMPLE 1

A silicone glycol (1) of general formula:

$$CH_3-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_{100}-\left[\underset{\underset{(CH_2)_3}{|}}{\overset{\overset{CH_3}{|}}{Si}}-O\right]_{50}-\underset{\underset{CH_3}{|}}{\overset{\overset{CH_3}{|}}{Si}}-CH_3$$
$$(C_2H_4O)_7$$
$$OH$$

was injected at a concentration of 1 ppm into a pressurised sample of live Ninian crude oil. The sample was then flashed to atmospheric pressure and the collapse time of the resulting foam recorded.

Similar experiments were then carried out with anti-foam free live Ninian crude oil and live Ninian crude containing 1 ppm of a conventional 60,000 cSt polydimethylsiloxane anti-foam agent.

The collapse times were as follows:

| | |
|---|---|
| Ninian crude alone | 46 secs |
| Ninian crude + 1 ppm conventional anti-foam agent | 40 secs |
| Ninian crude + 1 ppm silicone glycol (1) | 35 secs |

These results show that the silicone glycol is capable of reducing the collapse time of a live crude oil foam more effectively than a conventional additive.

EXAMPLE 2

A similar silicone glycol (2) of formula $$(CH_3)_3-Si-O-\left[\overset{\overset{CH_3}{|}}{\underset{\underset{CH_3}{|}}{Si}}-O\right]_{138}-\left[\overset{\overset{CH_3}{|}}{\underset{\underset{(CH_2)_3}{|}}{Si}}-O\right]_{18}-Si-(CH_3)_3$$
$$(C_2H_4O)_7$$
$$OH$$

was injected at a concentration of 10 ppm into a pressurised sample of stabilised Magnus crude oil. The sample was then rapidly reduced to atmospheric pressure and the collapse time of the resulting foam recorded.

A stabilised crude oil is one in which light ends have been removed by allowing the crude oil to reach equilibrium under atmospheric pressure.

The sample was pressurised by injecting it with a mixture of liquified propane and butane at a pressure of 4 bar g.

Similar experiments were then carried out with antifoam free stabilised Magnus crude oil and stabilised Magnus crude oil containing 10 ppm of the same conventional anti-foam as in Example 1.

The collapse times recorded were as follows:

| | |
|---|---|
| Magnus crude oil alone | 25 secs |
| Magnus crude oil + 10 ppm conventional anti-foam agent | Instantaneous |
| Magnus crude oil + 10 ppm silicone glycol (2) | Instantaneous |

These results show that the silicone glycol is equally as effective as a polydimethyl-siloxane in reducing the collapse time of a stabilised crude oil foam.

Stabilised crude oil foams are less difficult to break than live crude oil foams.

EXAMPLE 3

The silicone glycol (2) was tested further using the Bikerman gas sparging technique.

A fixed amount of stabilised crude oil is placed in the bottom of a sintered glass tube. Natural gas is sparged through at a steady rate to develop a foam. When the foam has stabilised its height is recorded. The test is then repeated with a known quantity of anti-foam agent added.

The anti-foaming index (AFI) is calculated from the following relationship:

$$AFI = \frac{h_1 - h_2}{h_1}$$

wherein $h_1$ = height of foam with no anti-foam added $h_2$ = height of foam with anti-foam $AFI$ = 1 indicates a perfect anti-foam agent = 0 indicates no activity = a negative valve indicates a profoamer.

An AFI of 0.97 was obtained at a concentration of active ingredient of 10 ppm for a sample size of 1 cm$^3$ and a gas flow rate of 34 cm$^3$/min.

The experiment was repeated replacing the silicone glycol with a commercially available polydimethylsiloxane anti-foam agent having a viscosity in excess of 10$^6$ cSt. An AFI of 0.98 was obtained.

EXAMPLE 4

Liquified propane and butane were mixed with stabilised Ninian crude oil under a pressure of 4 bar g in a thick glass walled sample vessel. The pressure was then released using a flow-rate controller until the liquified gases boiled and induced the formation of a foam which was viewed through the glass wall of the sample vessel.

20 ppm of the silicone glycol (2) were injected into the vessel and the foam collapsed instantaneously.

By way of comparison the experiment was repeated using a similar concentration of the polydimethylsiloxane anti-foam agent used in Example 3. On this occasion, instead of the foam collapsing, extra foam was produced.

It is believed that the superior performance of the silicone glycol is due to its relatively insolubility in the crude oil and that this is because of its polar nature.

We claim:

1. A method for separating crude oil containing associated gas into liquid oil and free gas in the presence of an anti-foam agent characterised by the fact that the anti-foam agent is a water-insoluble polysiloxane polyoxyalkylene graft copolymer

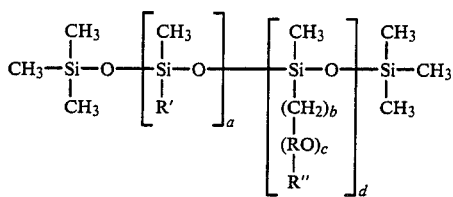

wherein

R is an ethylene, propylene or butene group or a mixture thereof;

R' is a hydrocarbyl group containing 1 to 8 carbon atoms;

R" is a hydroxyl group, an alkoxy group or an alkyl group containing 1 to 8 carbon atoms;

(a) is a number in the range of 100 to 250;

(b) is a number in the range of 1 to 6;

(c) is a number in the range of 1 to 10; and (d) is a number in the range 10 to 100.

2. A method according to claim 1 wherein the ratio of (a) to (d) is in the range 2:1 to 15:1.

3. A method according to claim 1 wherein R is an ethylene group.

4. A method according to claim 1 wherein R' is a methyl group.

5. A method according to claim 1 wherein R" is a hydroxyl group.

6. A method according to claim 5 wherein the ratio of silicon atoms to hydroxyl groups is in the range 2:1 to 16:1.

7. A method according to claim 1 wherein the siloxane content of the copolymer is in the range 30–70% by weight.

8. A method according to claim 1 wherein the copolymer is present in amount 0.1 to 20 ppm expressed on the basis of active ingredient.

* * * * *